United States Patent
Gardiner et al.

(10) Patent No.: US 12,269,781 B2
(45) Date of Patent: Apr. 8, 2025

(54) LARGE AREA SINTERING TEST PLATFORM AND ASSOCIATED METHOD OF USE

(71) Applicant: UNIVERSITY OF SOUTH FLORIDA, Tampa, FL (US)

(72) Inventors: Christopher Joseph Gardiner, Tampa, FL (US); Justin Nussbaum, Tampa, FL (US); Nathan Crane, Tampa, FL (US)

(73) Assignee: University of South Florida, Tampa, FL (US)

( * ) Notice: Subject to any disclaimer, the term of this patent is extended or adjusted under 35 U.S.C. 154(b) by 109 days.

(21) Appl. No.: 18/193,028

(22) Filed: Mar. 30, 2023

(65) Prior Publication Data
US 2023/0250028 A1 Aug. 10, 2023

Related U.S. Application Data

(63) Continuation of application No. 16/637,448, filed as application No. PCT/US2018/040624 on Jul. 2, 2018, now Pat. No. 11,643,366.
(Continued)

(51) Int. Cl.
| | |
|---|---|
| C04B 35/64 | (2006.01) |
| B22F 10/28 | (2021.01) |
| B22F 10/368 | (2021.01) |
| B22F 12/13 | (2021.01) |
| B22F 12/44 | (2021.01) |

(Continued)

(52) U.S. Cl.
CPC .............. *C04B 35/64* (2013.01); *B22F 10/28* (2021.01); *B22F 10/368* (2021.01); *B22F 12/13* (2021.01); *B22F 12/44* (2021.01); *B28B 1/001* (2013.01); *B29C 64/153* (2017.08); *B29C 64/264* (2017.08); *B29C 64/295* (2017.08); *B29C 64/393* (2017.08); *B33Y 10/00* (2014.12); *B33Y 30/00* (2014.12); *B33Y 50/00* (2014.12); *B22F 12/90* (2021.01)

(58) Field of Classification Search
None
See application file for complete search history.

(56) References Cited

U.S. PATENT DOCUMENTS

| | | | |
|---|---|---|---|
| 5,354,527 | A | 10/1994 | Frechette et al. |
| 2003/0052105 | A1 | 3/2003 | Nagano et al. |

(Continued)

OTHER PUBLICATIONS

Akande, S. O., Dalgarno, K. W., Munguia, J. & Pallari, J. 2016. Assessment of tests for use in process and quality control systems for selective laser sintering of polyamide powders. Journal of Materials Processing Technology, 229, 549-561.
(Continued)

*Primary Examiner* — Colin W. Slifka
(74) *Attorney, Agent, or Firm* — Meunier Carlin & Curfman LLC

(57) ABSTRACT

A large area sintering platform, system, and methodology. The system includes a convection oven with a projection window disposed within a top surface of the oven. A platform is disposed within the oven below the window at a spaced distance away from the window. A powder is positioned on top of the platform, with a thermocouple positioned within the powder on the platform. A high intensity projector moves in sync with the platform, and uses low intensities and long exposure times to project an image through the window onto the powder and sinter the powder to fabricate the desired model layer by layer.

6 Claims, 6 Drawing Sheets

Related U.S. Application Data

(60) Provisional application No. 62/541,861, filed on Aug. 7, 2017.

(51) Int. Cl.

| | |
|---|---|
| B22F 12/90 | (2021.01) |
| B28B 1/00 | (2006.01) |
| B29C 64/153 | (2017.01) |
| B29C 64/264 | (2017.01) |
| B29C 64/295 | (2017.01) |
| B29C 64/393 | (2017.01) |
| B33Y 10/00 | (2015.01) |
| B33Y 30/00 | (2015.01) |
| B33Y 50/00 | (2015.01) |

(56) References Cited

U.S. PATENT DOCUMENTS

| | | |
|---|---|---|
| 2008/0314878 A1 | 12/2008 | Cai et al. |
| 2013/0341838 A1 | 12/2013 | Snecma |
| 2014/0314613 A1 | 10/2014 | Hopkinson et al. |
| 2016/0279872 A1 | 9/2016 | Paternoster |

OTHER PUBLICATIONS

Barlow, Relating Operating Parameters between SLS Machines which have Different Scanner Geometries and Laser Spot Sizes. Solid Freeform Fabrication Symposium, 1992 Austin, Texas, 9 pages.

Beal, V. E., Paggi, R. A., Salmoria, G. V. & Lago, A. 2009. Statistical evaluation of laser energy density effect on mechanical properties of polyamide parts manufactured by selective laser sintering. Journal of applied polymer science. Journal of Applied Polymer Science, vol. 113, 2910-2919.

Bellehumeur, C. T., Bisaria, M. K. & Vlachopoulos, J. 1996. An experimental study and model assessment of polymer sintering. Polymer Engineering & Science, 36, 2198-2207.

Drummer, D., Drexler, M. & Wudy, K. 2015. Derivation of heating rate dependent exposure strategies for the selective laser melting of thermoplastic polymers. AIP Conference Proceedings, 1664, 160006.

Goodridge, R. D., Tuck, C. J. & Hague, R. J. M. 2012. Laser sintering of polyamides and other polymers. Progress in Materials Science, 57, 229-267.

Greco, A. & Maffezzoli, A. 2003. Polymer melting and polymer powder sintering by thermal analysis. Journal of Thermal Analysis & Calorimetry, 72, 1167-1174.

Haworth, B., Hopkinson, N., Hitt, D. & Zhong, X. 2013. Shear viscosity measurements on Polyamide-12 polymers for laser sintering. Rapid Prototyping Journal, 19, 28.

Hopkinson, et al., "Quantifying the degree of particle melt in Selective Laser Sintering®." CIRP annals 58.1 (2009): 197-200.

Hosseinnezhad, et al., "The unique effect of chain entanglements and particle morphology on the sintering of ultrahigh molecular weight polyethylene." Journal of Elastomers & Plastics 49.7 (2017): 609-629.

Launhardt, M., Wörz, A., Loderer, A., Laumer, T., Drummer, D., Hausotte, T. & Schmidt, M. 2016. Detecting surface roughness on SLS parts with various measuring techniques. Polymer Testing, 53, 217-226.

Negi, et al., Influence of Process Parameters on Mechanical Properties of Parts Fabricated by Selective Laser Sintering. Presented at 4th International Conference & Exhibition on Additive Manufacturing Technologies—AM 2014 "The Additive Manufacturing Defence—Aerospace Automotive—Biomedical Summit—2014", Sep. 1-2, 2014, Nimhans Convention Centre, Bangalore, India. Abstract.

Peyre, P., Rouchausse, Y., Defauchy, D. & Régnier, G. 2015. Experimental and numerical analysis of the selective laser sintering (SLS) of PA12 and PEKK semi-crystalline polymers. Journal of Materials Processing Tech., 225, 326-336.

Pilipović, A., Valentan, B. & Šercer, M. 2016. Influence of SLS processing parameters according to the new mathematical model on flexural properties. Rapid Prototyping Journal, 22, 258.

Rüsenberg, R. W., F. Knoop, H.-J. Schmid, M. Gessler, H. Pfisterer. Controlling the Quality of Laser Sintered Parts Along the Process Chain. Solid Free Form Symposium 2012 Austin, Texas.

Schmid et al. "Thermal and molecular properties of polymer powders for Selective Laser Sintering (SLS)," Aip Conference Proceedings, vol. 1779, 2016.

Schultz, J. P. 2003. Modeling Heat Transfer and Densification during Laser Sintering of Viscoelastic Polymers. Doctor of Philosophy, Virginia Polytechnic Institute and State University.

Setti, G. et al., 2014. Surface methods for monitoring the densification of parts in the selective laser sintering process. Rapid Prototyping Journal, 20, 157-163.

Starr, T. L., Gornet, T. J. & Usher, J. S. 2011. The effect of process conditions on mechanical properties of laser-sintered nylon. Rapid Prototyping Journal, 17, 418-423.

Tiwari, S. K., Pande, S., Agrawal, S. & Bobade, S. M. 2015. Selection of selective laser sintering materials for different applications. Rapid Prototyping Journal, 21, 630.

Vasquez, M., Haworth, B. & Hopkinson, N. 2011. Optimum sintering region for laser sintered nylon-12. Proceedings of the Institution of Mechanical Engineers, Part B: Journal of Engineering Manufacture, 225, 2240-2248.

Wortberg, et al., "Prediction of PA12 melt viscosity in Laser Sintering by a Time and Temperature dependent rheological model," RTejournal,2012.

Nussbaum, J. et al. "Evaluation of processing variables in large area polymer sintering of single layer components" Solid Freeform Fabrication 2016: Proceedings of the 26th Annual International Solid Freeform Fabrication Symposium; p. 796-801.

International Preliminary Report on Patentability issued for Application No. PCT/US2018/040624 dated Feb. 20, 2020.

International Search Report and Written Opinion in PCT/US18/40624. Mailed Sep. 18, 2018. 11 pages.

LARGE AREA SINTERING TEST PLATFORM AND ASSOCIATED METHOD OF USE

CROSS-REFERENCE TO RELATED APPLICATIONS

This nonprovisional application is a continuation of U.S. application Ser. No. 16/637,448, now U.S. Pat. No. 11,643, 366, entitled "Large Area Sintering Test Platform and Associated Method of Use," filed Feb. 7, 2020, by the same inventors, which is a National Stage Entry of PCT/US2018/040624, entitled "Large Area Sintering Test Platform and Associated Method of Use," filed Jul. 2, 2018 by the same inventors, which claims priority to U.S. Provisional Patent Application No. 62/541,861, entitled "Large Area Sintering Test Platform," filed Aug. 7, 2017 by the same inventors, the entirety of which is incorporated herein by reference.

FEDERALLY SPONSORED RESEARCH OR DEVELOPMENT

This invention was made with Government support under Grant No. CMMI 1563037 awarded by the National Science Foundation. The government has certain rights in the invention.

BACKGROUND OF THE INVENTION

1. Field of the Invention

This invention relates, generally, to additive manufacturing. More specifically, it relates to laser sintering.

2. Brief Description of the Prior Art

Additive manufacturing (AM) is a rapidly growing technology that enables fabrication of components directly from digital models without part-specific tooling. Many industries are adapting AM into their manufacturing processes because it can quickly create complex and functional components. Laser sintering (LS) is an AM method that produces high quality parts suitable for end-use (Drummer, D., et al. 2015. Derivation of heating rate dependent exposure strategies for the selective laser melting of thermoplastic polymers. *AIP Conference Proceedings*, 1664, 160006; Gibson, I., et al. 2015. Additive manufacturing technologies: 3D printing, rapid prototyping, and direct digital manufacturing, New York, NY: Springer, 2015. Second edition). In LS, a focused laser scans across a bed of preheated powder to locally fuse particles. A new layer of powder is then deposited on top of the first, and the process repeats. This can be seen in FIG. 1.

Partially crystalline polymers with a well-defined melting point typically perform best because the powder bed can be heated near the melting point so that relatively little energy input is required to melt them (S Rüsenberg. R. W., et al. Controlling the Quality of Laser Sintered Parts Along the Process Chain. Solid Free Form Symposium 2012 Austin, Texas.; Greco, A., et al. 2003. Polymer melting and polymer powder sintering by thermal analysis. *Journal of Thermal Analysis & Calorimetry*, 72, 1167-1174). Part distortion is reduced if the material has a small crystallization shrinkage and/or a large gap exists between the recrystallization and melting temperatures (Goodridge, R. D., et al. 2012. Laser sintering of polyamides and other polymers. *Progress in Materials Science*, 57, 229-267). While LS has been demonstrated with a wide range of materials (Goodridge, R. D., et al. 2012), the vast majority of all polymer LS components are produced with polyamide 12 (PA12) because it best meets these stringent constraints (Tiwari. S. K., et al. 2015. Selection of selective laser sintering materials for different applications. *Rapid Prototyping Journal*, 21, 630).

LS systems are typically composed of a laser, a galvanometer for steering the laser, and a powder spreading system contained within an Inert environment (Gibson et al., 2015). To produce parts economically with high spatial resolution, commercial systems generally have a small laser diameter (~0.5 mm) with high scanning speeds (~1-5 m/s) (Launhardt, M., et al. 2016. Detecting surface roughness on SLS parts with various measuring techniques. Polymer Testing, 53, 217-226; Akande, S. O., et al. 2016. Assessment of tests for use in process and quality control systems for selective laser sintering of polyamide powders. Journal of Materials Processing Technology, 229, 549-561; Peyre. P., et al. 2015. Experimental and numerical analysis of the selective laser sintering (SLS) of PA12 and PEKK semi-crystalline polymers. *Journal of Materials Processing Tech.*, 225, 326-338) and high optical intensities (900-4,500 W/cm$^2$) (Pilipović, A., et al. 2016. Influence of SLS processing parameters according to the new mathematical model on flexural properties. *Rapid Prototyping Journal*, 22, 258; Barlow, J. W., et al. 1992. Relating Operating Parameters between SLS Machines which have Different Scanner Geometries and Laser Spot Sizes. Solid Freeform Fabrication Symposium). A single area is typically exposed for micro- to milli-seconds at a time (Akande et al., 2016; Peyre et al., 2015; Launhardt et al., 2016). During the brief exposure, high local temperatures are generated which can degrade the polymers. Area-based patterning could provide an alternative for economical processing of materials while providing longer exposure times at each location. Longer exposure times could be beneficial by limiting the peak temperature, in turn decreasing degradation effects, thus providing additional time to ease the use of closed loop process control, and by providing a longer time period for the polymer particles to sinter and density.

Polymer sintering typically occurs through a time- and temperature-dependent viscous sintering process. It is a two-stage process starting with particle coalescence, followed by pore shrinkage and removal. The early stages are described by a simple viscous sintering model developed by Frenkel as seen below in Equation 1 (Frenkel, J. 1945. Viscous flow of crystalline bodies under the action of surface tension. *Journal of Physics*, 12, 385-431; Haworth, B., et al. 2013. Shear viscosity measurements on Polyamide-12 polymers for laser sintering. *Rapid Prototyping Journal*, 19, 28):

$$\left(\frac{a}{R}\right)^2 = \frac{3}{2}\left(\frac{\gamma t}{R\eta_o}\right) \quad (1)$$

where a is the radius of the growing neck between two spherical particles of radius R, $\gamma$ is the particle's surface energy, $\eta_o$ is the zero-shear viscosity, and t is time.

Liquid phase sintering is driven by the minimization of surface tension forces through reduction of the surface area (Greco et al., 2003). The zero-shear viscosity decreases with increasing temperature, reducing the required sintering time. In order to fully fuse and coalesce these particles, the polymer must have sufficiently low viscosity to allow the material to flow before cooling (Bellehumeur, C. T., et al. 1996. An experimental study and model assessment of polymer sintering. *Polymer Engineering & Science*, 36, 2198-2207). Low strength components with high porosity will result if viscosities are too high or if heating times are too short. Prior polymer sintering work has focused on point processing with a scanning laser.

Projection sintering can potentially expand the range of materials that can be sintered by permitting more control over peak temperature and sintering time. With the longer exposure times typical with projection sintering, thermal losses can become significant and must be accounted for. Common evaluation methods that do not account for losses fail to predict sintering outcomes. Development of new process parameters is critical in the development of long exposure polymer sintering processes.

Accordingly, what is needed is a system/method for densifying polymer powders with longer exposures and larger areas to cure an entire layer simultaneously. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the Invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art tinder the applicable statutory provisions; or is known to be relevant to an attempt to solve any problem with which this specification is concerned.

BRIEF SUMMARY OF THE INVENTION

The long-standing but heretofore unfulfilled need for an improved large area sintering test platform is now met by a new, useful, and nonobvious invention.

In one embodiment, the present invention provides a powder sintering method, which includes, positioning a powder layer on a surface of a platform, wherein the platform is positioned within a sintering chamber and wherein the sintering chamber comprises a window, and preheating the powder layer on the platform. The method further includes, projecting an image from a high intensity projector through the window of the sintering chamber and onto the powder layer, wherein the image is projected as a predetermined optical intensity and sintering the powder layer based upon the image projected from the high intensity projector resulting in a 2D cross-sectional layer of sintered powder.

The powder layer on the entire surface of the platform may be sintered at one time. Alternatively, individual subsections of the powder layer on the surface of the platform may be sintered using one or more portions of the image and the individual subsections may then be combined to form the 2D cross-sectional layer of sintered powder. In another embodiment, the 2D cross-sectional layer may be formed by projecting a portion of the image onto a subsection of the powder layer, moving the projection to a next subsection of the powder layer and updating the protected image to a next portion of the image and continuing to move the protection to subsequent subsections and continuing to update the projected image.

The method may further include, monitoring the temperature of the powder layer during sintering, to generate monitored temperatures, comparing the monitored temperatures to one or more desired temperatures and adjusting a temperature of the projector based on a difference between the monitored temperatures and the one or more desired temperatures.

The method may further include, prior to projecting the image onto the powder layer positioned on the platform, directly melting the powder layer and then allowing the melted powder layer to solidify on the platform to anchor subsequent 2D cross-sectional layers of sintered powder to each other to reduce warping of the layers.

In another embodiment, the method may include, partially sintering the powder layer by reducing an intensity of the high intensity projector or reducing an exposure time of the high intensity projector and then gradually increasing the intensity of the high intensity projector or the exposure time of the high intensity projector during the sintering of subsequent powder layers to anchor subsequent 2D cross-sectional layers of sintered powder to each other to reduce warping of the layers.

In another embodiment the sintering method may include, defining of a first plurality of portions of the powder layer on the platform, wherein the portions of the first plurality of portions are substantially non-adjacent to each other, defining a second plurality of portions of the powder on the platform, wherein the portions of the first plurality of portions are substantially non adjacent to each other and independently sintering the first plurality of portions of the powder layer and sintering the second plurality of portions of the powder layer to reduce warping of the layers.

In various embodiments, the present invention additionally provides a system for sintering a powder, which includes, a sintering chamber comprising a window, a platform positioned within the sintering chamber and at a spaced apart distance from the window, wherein the platform holds a powder layer thereupon, a powder preheating mechanism to preheat the powder layer on the platform and a high intensity projector disposed in overlying relation to the window and positioned to project an image through the window. In accordance with the present invention, the high intensity projector projects an image through the window and onto the powder layer at a predetermined optical intensity, whereby the system sinters the powder layer based upon the image projected from the high intensity projector, resulting in a 2D cross-sectional layer of sintered powder. The powder layer may include one or more combinations of a polymer, a metal, and a ceramic.

The system may further include a temperature measurement device to measure the temperature of the powder layer on the platform. In one embodiment, the system may also include a closed loop temperature control of the projector to sinter the powder layer. The closed loop temperature control may include, a thermal camera to monitor temperatures of the 2D cross sectional layer of sintered powder to generate monitored temperatures, wherein the monitored temperatures are passed through a control algorithm to compare the monitored temperatures to desired temperatures and a signal is transmitted to the projector to alter a temperature of the projector based on a difference between the monitored temperatures and the desired temperatures.

The window may be transparent to a majority of the wavelength of light provided by the projector and opaque or reflective to a majority of light in a temperature sensing wavelength band. Alternatively, the window may be opaque to the dominant emitted wavelengths through which the image is projected by the projector. In one embodiment, the window may be formed of borosilicate glass or fused quartz. In an additional embodiment, the window may further include a lens.

The system may further include a powder reservoir for depositing additional powder layers onto the platform for generation of subsequent 2D cross sectional layers of sintered powder. The platform of the system may also be movable within the chamber relative to the window, thus permitting the projector to sinter large areas on the platform.

The projector may include an optical power provided by one of, an ultra-high-pressure mercury vapor lamp, a metal halide lamp, a high intensity discharge lamp, a high-pressure sodium lamp, a low-pressure sodium lamp, a light emitting diode and a laser, to transmit light in the visible or ultraviolet spectrum.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5A shows 4.0 s of exposure time with 1.0 W/cm$^2$ power density, FIG. 5B shows 3.33 s of exposure time with 1.2 W/cm$^2$ power density, and FIG. 5C shows 2.0 s of exposure time with 2.0 W/cm$^2$ power density. The degree of sintering is decreased as exposure time increases as evident by the rougher surface finish.

DETAILED DESCRIPTION OF THE INVENTION

Figure 1:
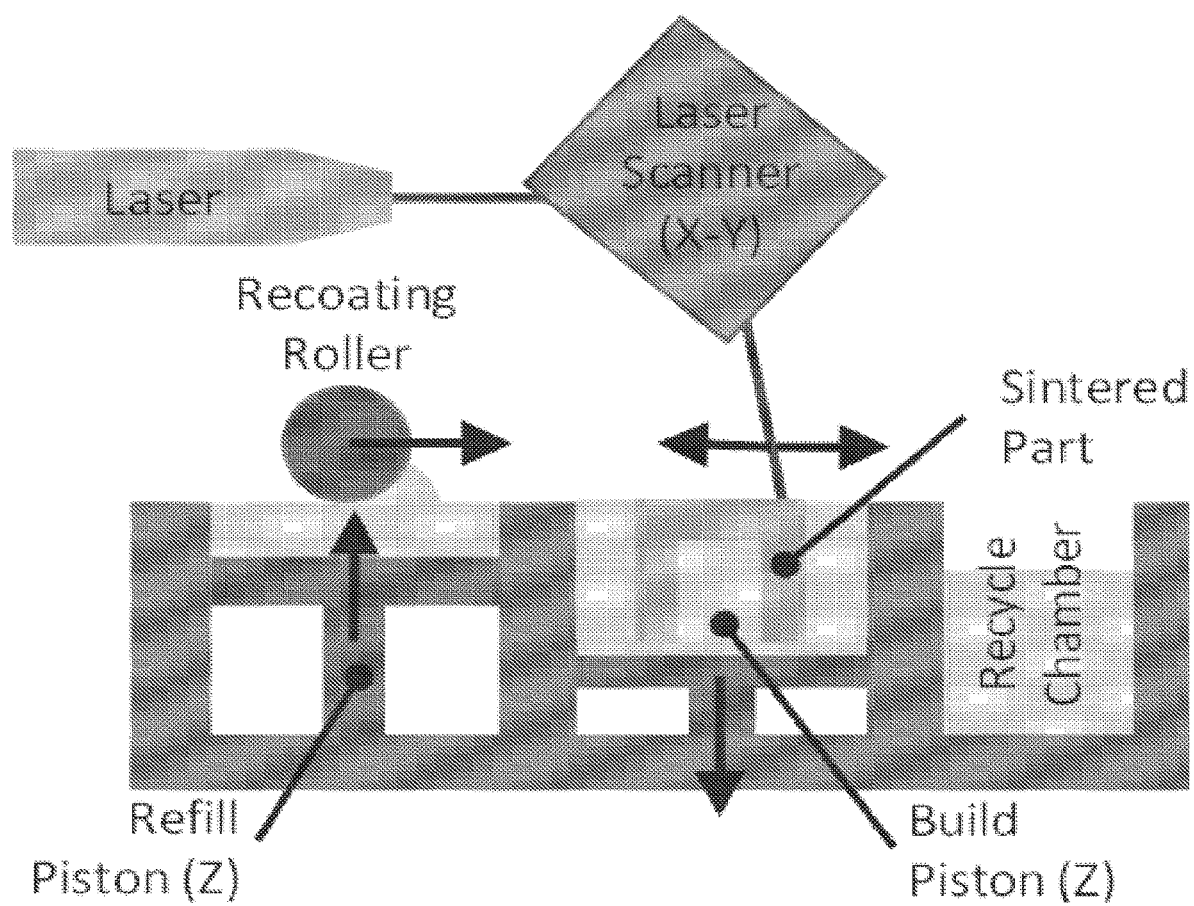
FIG. 1 shows that during a conventional LS process, a laser and laser scanner sinters the powder in the X-Y axis while the recoating roller and refill piston supplies powder for a new layer.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content dearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

The current invention contemplates hardware and/or software to control and monitor the thermal profile/heating rates of the laser sintering cross section over a large area. It also contemplates repeatable powder bed and ambient environment conditions. The system allows for the rapid creation of three-dimensional (3D) plastic parts by laser sintering entire cross sections of polymer/plastic powder at once (i.e., simultaneously). Benefits may include greater speed, improved consistency, improved spatial control, more desirable material properties in the finished parts than those found in the conventional art. These improvements may allow for more powdered materials to be sintered in a timely fashion and may increase the repeatability in which the layers are made.

In certain embodiments, the current Invention is a large area sintering system that utilizes a projector to heat up and sinter desired cross sections (of an end product) from plastic powder. The system has the ability to deposit thin layers of powder to build 3D parts through multiple layer deposition/cross section sintering stages. The system includes closed loop control of the projector to sinter the target area. A thermal camera is used to monitor temperatures of finite regions of the cross section, and this temperature is passed through a control algorithm comparing the actual temperature to the desired temperature at points of interest and sending the modified signal to those regions that are calculated to obtain the desired temperature and/or heating rate (high resolution closed loop temperature control of the sintered cross section).

The system is capable of moving the powder bed with respect to the projector image area. This allows the projector to sinter larger areas than what it can do at a single time. There Is a synchronized motion of powder bed with respect to the image.

To create a better viewing angle for the thermal camera, the system can use a metallic (or metal-coated) mirror to view the powder bed temperature, with an image transformation performed in software to relate this warped image to the projected image.

The use of different wavelengths of light for heating and observation is contemplated. This allows the use of a window that is transparent in the heating wavelength band from the projector but opaque or reflective in a temperature sensing band. In one embodiment, temperature detection is accomplished by measuring at how bright the sintered powder is in a particular wavelength region and converting the brightness into an estimate of the temperature of the powder. As such, the window into the sintering chamber may be selected so that the temperature sensing wavelength does not escape while the heating wavelength for performing the sintering of the powder can penetrate the window. Additionally, one or more mirrors or other optical elements can be used to transmit the light at the temperature sensing wavelength to a separate opening for temperature measurement. In one embodiment, the window itself could act as both the window and a mirror for transmission. Use of a mirror to observe the powder bed also creates a more compact system normal to the plane of the powder. This has the added benefit of shortening the focal distance for the projection optics.

The use of a window through which the image is projected can be transparent to the heating radiation but opaque to the dominant emitted wavelengths through which the image is projected. For example, borosilicate glass can be used as a window for the projector to shine through. Its low transmissivity in the infrared spectrum allows the glass to be an effective insulator against radiation heat transfer out of the build volume, thus keeping the build volume ambient temperature higher and in turn reducing power requirements from the projector to sinter.

Now referring to the hardware related to powder deposition, a rotating drum with grooves can be used with a powder reservoir thereabove to deposit finite amounts of powder onto powder bed for new layers. Various other methods of powder deposition are also considered to be within the scope of the present invention. The deposition of the powder, combined with synchronized movement of the powder bed underneath, as previously discussed, allows the powder deposition process to be carefully controlled.

Example

In an embodiment, the current invention relates to projection sintering, specifically a system for selectively sintering large areas of polymer powder simultaneously with a high-power projector. The suitability of laser sintering process parameters for projection sintering is evaluated herein, as it uses substantially lower intensities, longer exposure times, and larger areas than conventional LS.

Experimental Setup—Projection Sintering

Figure 2:
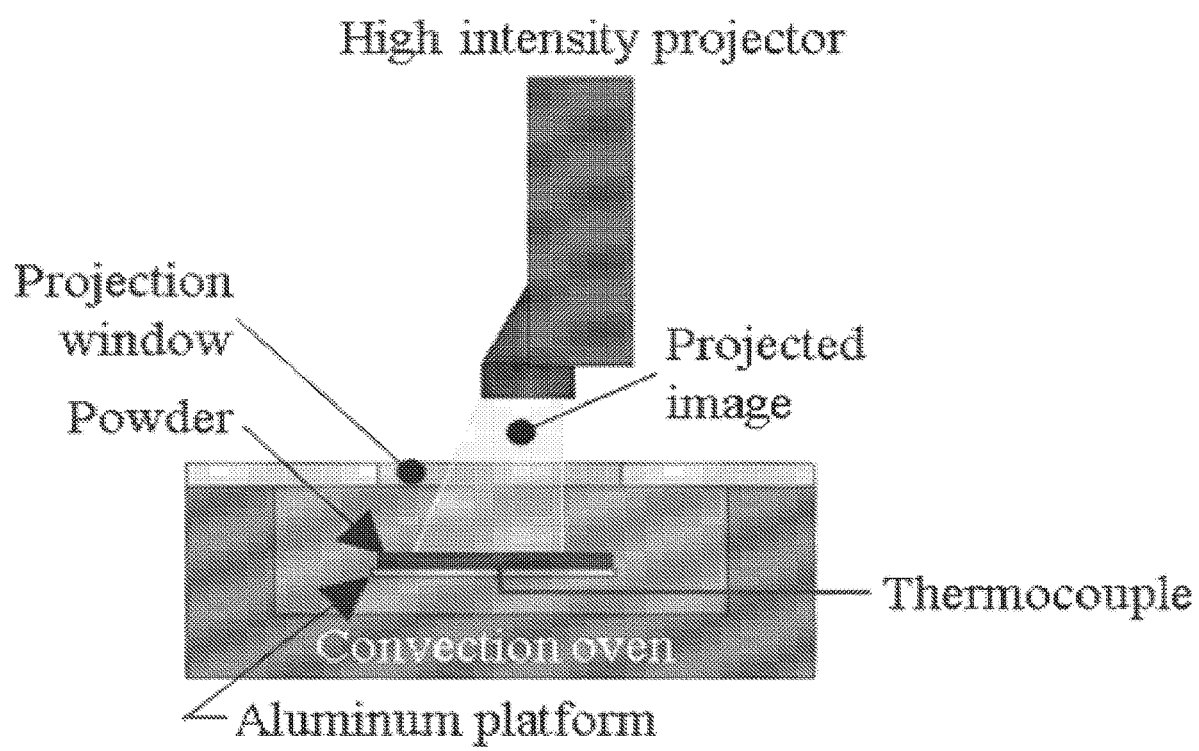
FIG. 2 depicts an aluminum plate holding a 1.5 mm layer of PA12 powder at a uniform temperature. A high-power projector applies patterned light to sinter the powder through a borosilicate window.

A system was designed to enable sintering of large areas with relatively low intensities and longer than typical exposure times when compared to LS. A schematic of the test system is illustrated in FIG. 2. In this system, a high intensity projector (e.g., OPTOMA X316 projector) was modified to decrease the exposure area from a maximum of about 278,709 $cm^2$ to about 3.7 $cm^2$, which provided a pixel resolution of about 20 μm. Decreasing exposure area concentrated and increased the intensity of the projected image. Additionally, the optical power was boosted from about 1.8 W to about 7.3 W, as measured from a fully white projected image on a THORLABS S310C thermal power sensor, which measures the heat energy of the input light with a flat absorption spectrum in the measurement range (visible light to very deep infrared). Overall, this provides an intensity increase from about $6.5 \times 10^{-6}$ $W/cm^2$ to about 2 $W/cm^2$. This makes the modified projector an effective area-based heating tool with high thermal contrast. The intensity range described is exemplary in nature and, in general, higher intensity levels require a shorter exposure time. Additionally, as the exposure time increases and the intensity decreases, heat conducted to the surrounding material causes small features to be lost and sharp edges to become rounded. Therefore, minimum intensity/exposure time is dependent upon the parts intended application. For example, an exposure time of 3.75 seconds and an intensity of 1.8 $W/cm^2$, would be considered near the lower limit for producing quality parts. Higher intensity combined with lower exposure times will produce even higher strength/quality parts.

The projector's optical power is provided by a 190 W ultra-high-pressure mercury vapor (UHP) bulb. UHP bulbs produce a broad spectrum of light that ranges from the ultra violet (UV) to infrared (IR) spectrum, though a majority of the energy is contained within the visible spectrum (400-700 nm) and produces a mostly white light. The projector's optics and lamp are optimized to transmit light in the visible spectrum, filtering out the UV and IR light. It is assumed a negligible amount of IR light remains in the projected image.

To test the system, an approximately 1.5-mm thick layer of PA12 powder was spread onto an aluminum platform using a blade. Similar to LS, PA12 powder was preheated to 170° C. as measured by a thermocouple placed in the center of the platform halfway through the thickness of the powder. The test platform was placed about five (5) cm below/from a transparent window in a modified convection oven. The convection oven provided even heating from all directions through convection rather than through conductive and radiative heaters, which are commonly used in conventional LS systems.

Because white powders reflect most of the visible light away from the surface, absorbing only a small portion of the optical energy from the incident light, a black PA12 powder (part number PA2202; produced by EOS) was selected for testing in order to maximize the energy absorbed by the powder. The black PA12 powder absorbs ~47-65% of the incident light within the first 100 μm of powder and 76-95% within 200 μm from the surface. It is noted that PA2202 is manufactured for the AM industry and is commonly used in LS systems to create black components. The current system was utilized to sinter single layer parts and assess the impact of varied exposure conditions on density, thickness, and strength of the exposed layers.

Figure 3A:
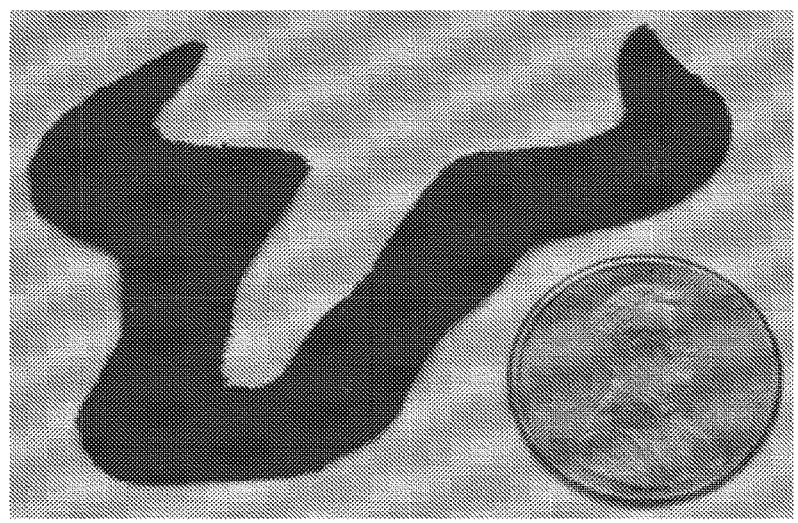
FIG. 3A depicts an example part created with a single, large area exposure.
Figure 3B:
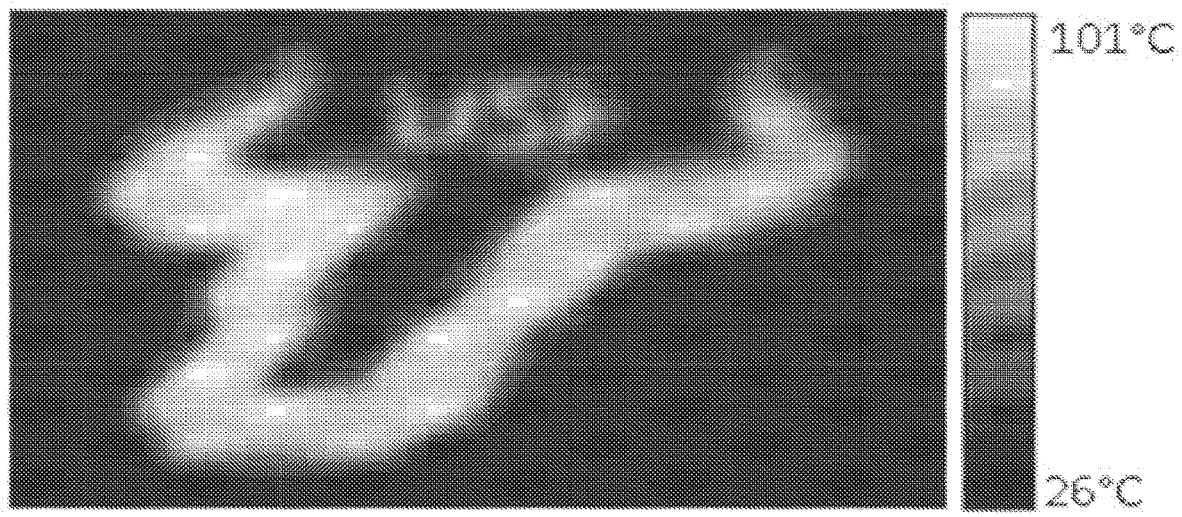
FIG. 3B depicts an example thermal image of the University of South Florida logo on a PA12 powder bed created with the projection sintering system.

FIGS. 3A-3B depict an example of a layer of product/item created with this system (FIG. 3A) and a thermal image thereof (FIG. 3B), demonstrating high thermal contrast between the created layer and the remainder of the environment/powder.

Analysis of Single Layer Parts

Degree of Densification

To analyze the degree of densification and layer thickness, four test coupons were sintered under varying degrees of exposure time at the maximum optical intensity of 2 $W/cm^2$. After cooling, the parts were removed from the un-sintered powder. They were cooled in liquid nitrogen and broken to create a brittle fracture with a nearly flat fracture surface. These components were then sputter-coated with gold-palladium to create a conductive surface and imaged with a scanning electron microscope (e.g., HITACHI S800 SEM), the results of which can be seen in FIGS. 4A-4D.

Figures 4A, 4B, 4C, 4D:
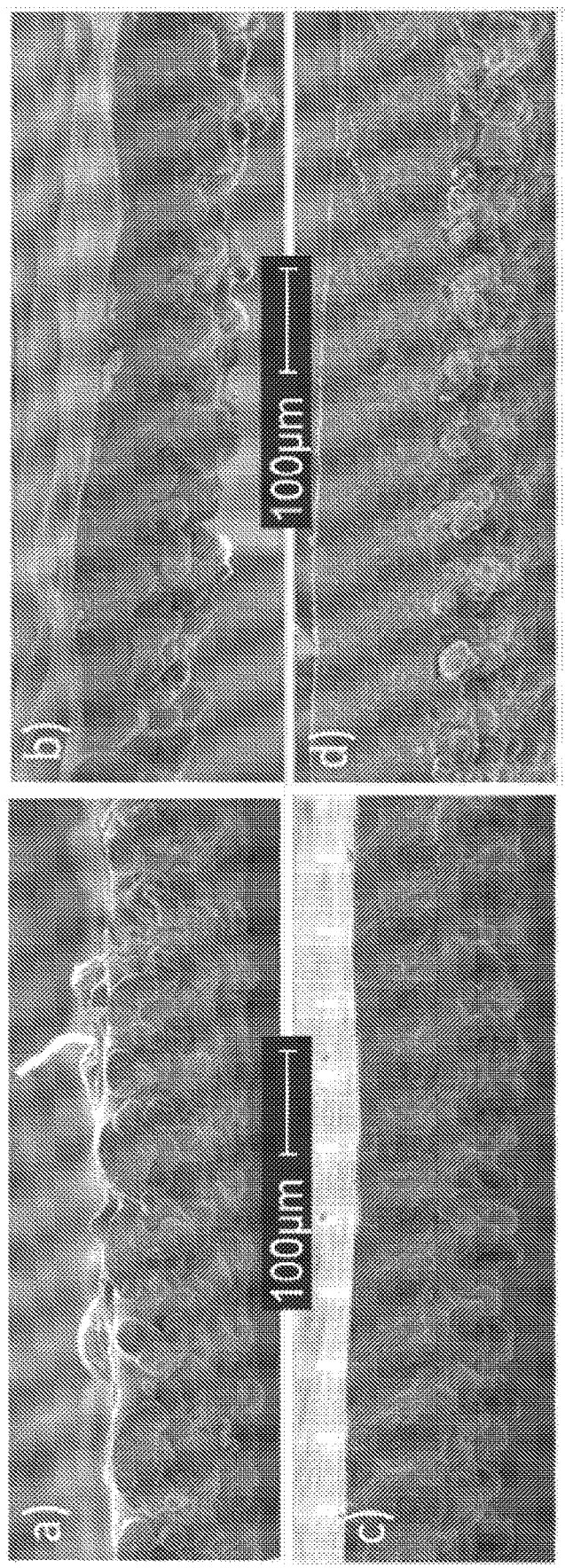
FIGS. 4A-4D shows that all components were sintered with 2 W/cm$^2$ and are shown at 100× magnification. The exposed surface is on top in all images. Exposures were 1.5 s (4A), 1.75 s (4B), 2.0 s (4C), and 3.0 s (4D).

Exposure times below 1.5 s produced parts that were too weak to be handled and therefore were not imaged. As seen in FIG. 4A (1.5 s exposure time), short exposure times produced limited particle necking with individual particles clearly visible through the entire part thickness. This resulted in a low degree of densification and low strength. The bottom surface shows little evidence of sintering even though the parts were lightly brushed to remove any loose powder before imaging.

As the exposure time is increased, a continuous dense layer is formed (FIG. 4B (1.75 s)), increasing in thickness with longer exposures (FIG. 4C (2 s) & FIG. 4D (3 s)). The exposed top surface becomes smoother as well. It has been shown (Seth, G. D. O., et al. 2014. Surface methods for monitoring the densification of parts in the selective laser sintering process. *Rapid Prototyping Journal,* 20, 157-163) that a smooth surface finish represents a high density and a high tensile strength, indicating good particle coalescence and therefore good sintering quality. After 3.0 s, the fully dense layer is approximately 100 □m thick. This is encouraging for the formation of multilayer parts, as this is the standard layer thickness in LS and many other AM processes. A highly dense layer is a fundamental necessity and quality indicator for high component strength.

Layer/Component Strength

In order to effectively analyze the impact of exposure time and intensity, single layer tensile test specimens were created using a single exposure. The components were tested in accordance to ASTM standard D638-10. The tensile specimen geometry used in this study is similar to the standard. However, it was scaled down to fit the maximum exposure size and the gauge width was increased to increase the maximum achievable force for ease of measurement by the force sensor.

The specimen had an overall length of 23.0 mm, a gauge length of 8.0 mm, a gauge width of 4.6 mm, a grip length of 4.2 mm, a grip width of 6.6 mm, and a transition radius of 2.0 mm. After removal from the powder bed, the back of each specimen was lightly brushed then then cleaned with compressed air to remove loose non-load bearing powder. The specimen thickness was measured with a dial micrometer whose contact tip was replaced with a blunted needle. The blunt needle contact tip was used to facilitate measurement of curled samples. The specimens were measured on the long axis centerline at three locations and averaged. Tensile testing was conducted on a hydraulic tensile testing machine (e.g., MTS 810).

During these tests, the components that were sintered at low energy densities (short exposure time or low intensity) showed a low degree of sintering and remained flat but were also of insufficient strength to be handled. The specimens that were well-sintered exhibited some degree of curling at the edges directly after exposure in the powder bed. This made it difficult to measure the cross-sectional width in the gauge length. The forces recorded during tensile testing could not be converted to stress values because of this. Since forces do not demonstrate a material property, they are used here only for relative comparison.

Multiple methods exist for parameterizing and evaluating sintering conditions in LS that are successful in accurately predicting sintering outcomes during the short exposure times in LS. For example, Andrew's Number is cited extensively and relates various processing parameters to the overall energy input into the powder (Vasquez, M., et al. 2011. Optimum sintering region for laser sintered nylon-12. *Proceedings of the Institution of Mechanical Engineers, Part B: Journal of Engineering Manufacture,* 225, 2240-2248; Schultz, J. P. 2003. *Modeling Heat Transfer and Densification during Laser Sintering of Viscoelastic Polymers.* Doctor of Philosophy, Virginia Polytechnic Institute and State University). Another effective parameter is the energy melt ratio, which is a comparison of the amount of energy input into a specific volume of powder divided by the actual amount of energy required to melt that volume of powder (Starr, T. L., et al. 2011. The effect of process conditions on mechanical properties of laser-sintered nylon. *Rapid Prototyping Journal.* 17, 418-423). Both methods would predict that process performance would be independent of exposure time/intensity as long as total energy input remains constant.

To see if this holds true in projection sintering, a constant energy density was maintained by increasing exposure time as the light intensity was decreased. Three different energy density values were chosen for testing—4.0 $J/cm^2$, 6.0 $J/cm^2$, and 8.0 $J/cm^2$, representing a low, medium, and high amount of input energy, respectively.

Figure 5C:
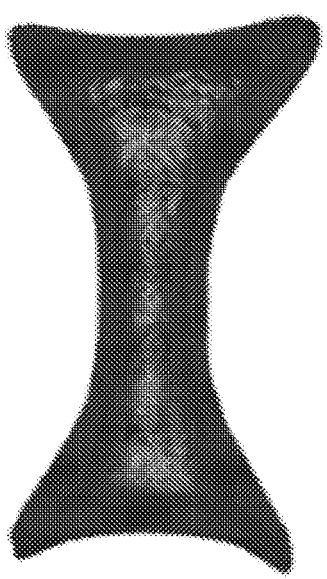
FIGS. 5A-5C depict tensile specimens made with the same energy density (4.0 J/cm$^2$).
Figure 5B:
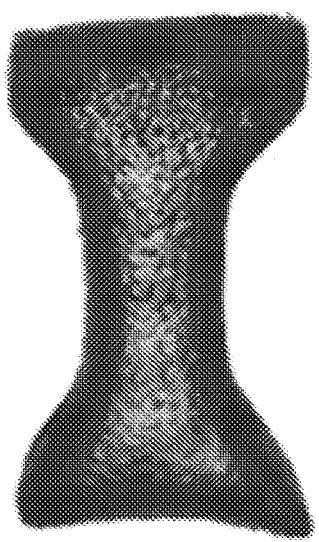
Figure 5A:
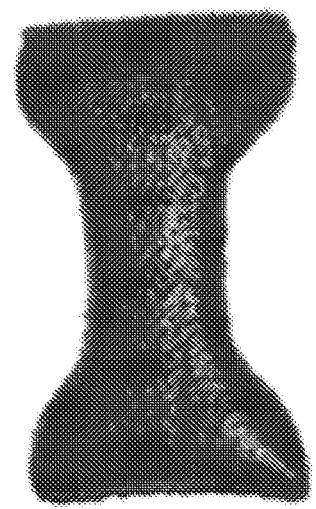
Figure 6:
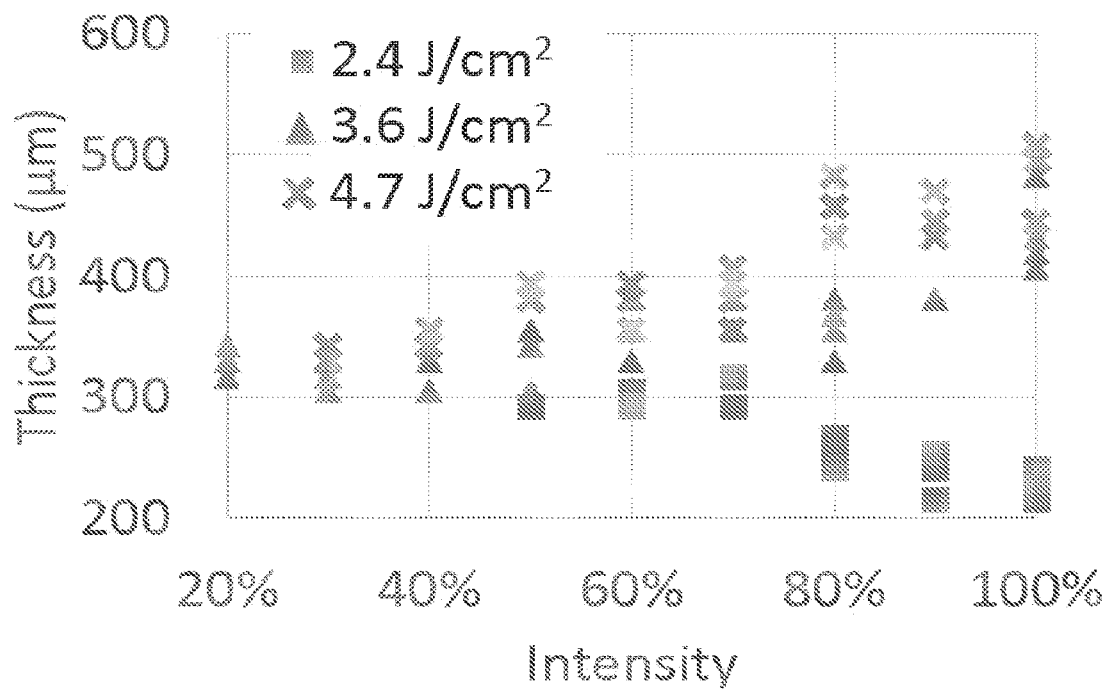
FIG. 6 depicts testing conditions and results for the tensile bars created with a constant energy density, at three different values.
Figure 6:
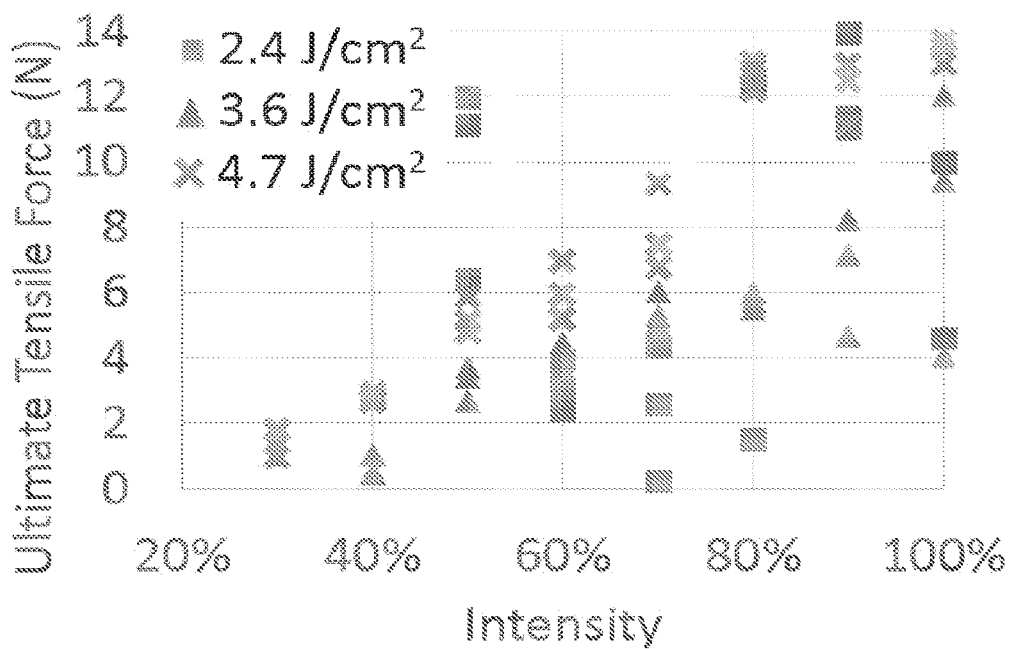

FIGS. 5A-5C show that process outcomes clearly vary with exposure time for constant energy input. Increasing exposure time and decreasing intensity creates weaker parts. While they had less warping, the load carrying capacity is also reduced, as shown in FIG. 6. It is evident from the pictures shown in FIGS. 5A-5C that less sintering occurred in the parts that were exposed for a longer period of time at a lower intensity. The specimens with 4.0 $J/cm^2$ energy input had a very rough surface finish, were very weak, and showed significant variation due to handling difficulties.

At higher energy inputs (3.6 $J/cm^2$, 4.7 $J/cm^2$), both thickness and strength vaned significantly with changes in optical intensity, even though the overall energy input remained constant. This shows that energy input alone is not a sufficient metric for characterizing the process. At each optical intensity, both strength and part thickness also increased with energy input. As seen in FIG. 6, the lower strength when using a lower optical intensity (longer exposure time) is attributed to losing more energy to the surrounding powder and the environment when it is input over a longer time-decreasing the peak temperature and increasing the viscosity during sintering.

Conventional LS process parameters (Andrew's number, energy melt ratio) assume all input energy is absorbed into the powder and used in the melting process. Short exposure times (<1 ms is typical in LS) at long wavelengths (10.6 □m is typical) where the powder heavily absorbs the light, provides little time to allow for thermal losses during the heating process. Recently, Drummer et al. (Drummer, 2015) have studied this effect, demonstrating that higher degrees of sintering (higher strength and density) occur with slower heating rates and additional energy input. However, an upper bound exists as the resulting higher temperatures begins to degrade the polymer, resulting in weaker parts. Literature values for the Andrew's Number necessary to produce high strength dense parts with PA12 vary from 2 to 3.5 $J/cm^2$ (Vasquez et al., 2011; Beal, V. E., et al. 2009. Statistical evaluation of laser energy density effect on mechanical properties of polyamide parts manufactured by selective laser sintering. *Journal of applied polymer science*; S. Negi, S. D., et al. Influence of Process Parameters on Mechanical Properties of Parts Fabricated by Selective Laser Sintering International Conference on Additive Manufacturing Technologies, 2014 Bangalore). However, projection sintering samples with >4 s heating times with 4 $J/cm^2$ were too weak to be handled because not enough energy was imparted in time to fully sinter the PA12; in other words, due to thermal losses during heating, the powder did not melt significantly. This difference in energy input could be related to the reduced absorptivity of the visible light used by the projector in addition to the increased thermal losses during heating.

In order to create components with equal degrees of sintering, as would be indicated by equal values of part thickness and breaking force, the energy density must increase as exposure time increases to make up for the lost thermal energy. However, predicting the energy input required for different exposure times in order to achieve a constant material output will be a function of geometry, powder, bed position, and environmental variables.

In conclusion, the disclosed example discusses an area-based sintering technology used to analyze the role of exposure time and optical intensity in polymer sintering. This system is capable of sintering entire 2D cross-sections with a single exposure. This work evaluated single layer PA12 components to understand the interaction between the PA12 powder and visible light absorption. The single layer parts evaluated in this study could act as the foundation for future 3D parts. They also show that with projection sintering, layer thickness can be controlled and layers much thicker than the industry standard of 100 μm can be produced. Components created with this system show that increased light intensity or exposure time increases the degree of sintering but part properties are not directly proportional to the energy input as assumed in LS.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for sintering a powder comprising:
   a projector having a predetermined image area to heat up and sinter a predetermined cross section of a powder layer;
   a thermal camera configured to measure a temperature of a finite region of the predetermined cross section and transfer the measured temperature to a control algorithm, wherein the control algorithm is configured to send a modified signal to obtain a predetermined temperature based on the measured temperature;
   a powder bed having a synchronized motion with respect to the predetermined image area.

2. The system of claim 1, further comprising a powder reservoir for depositing additional powder layers onto the platform.

3. The system of claim 2, wherein the system further comprises a rotating drum combined with the powder reservoir for depositing additional powder layers onto the platform.

4. The system of claim 3, wherein the rotating drum comprises one or more grooves.

5. The system of claim 2, wherein the reservoir is combined with a synchronized movement of the platform to control deposition of additional powder layers onto the platform.

6. The system of claim 1, wherein the projector includes an optical power provided by one of an ultra-high-pressure mercury vapor lamp, a metal halide lamp, a high intensity discharge lamp, a high-pressure sodium lamp, a low-pressure sodium lamp, a light emitting diode or a laser.

* * * * *